United States Patent [19]

Fukuba et al.

[11] 4,064,317

[45] Dec. 20, 1977

[54] FLAME-RESISTANT PLASTER BOARD AND ITS MANUFACTURE

[75] Inventors: Kozo Fukuba; Minematsu Miyazaki, both of Niihama, Japan

[73] Assignee: Sumitomo Chemical Company, Limited, Osaka, Japan

[21] Appl. No.: 655,134

[22] Filed: Feb. 4, 1976

[30] Foreign Application Priority Data

Feb. 5, 1975 Japan .................................. 50-15810
Dec. 19, 1975 Japan .................................. 50-152392

[51] Int. Cl.$^2$ ............................................. B32B 9/04
[52] U.S. Cl. ...................................... 428/537; 252/8.1; 428/539
[58] Field of Search ............... 428/537, 538, 539, 920, 428/921; 252/8.1; 260/DIG. 24

[56] References Cited

U.S. PATENT DOCUMENTS 3,973,074   8/1976   de Lissa .............................. 428/537

*Primary Examiner*—Marion E. McCamish
*Attorney, Agent, or Firm*—Birch, Stewart, Kolasch and Birch

[57] ABSTRACT

A flame-resistant plaster board characterized in that the board paper constituting the outside of the plaster board contains at least one alkali compound selected from the group consisting of hydroxides and salts of alkali metals and alkaline earth metals which easily decompose or melt on heating. Said flame-resistant plaster board is improved in that the generation of smoke on heating is inhibited without reduction of the mechanical strength.

8 Claims, No Drawings

FLAME-RESISTANT PLASTER BOARD AND ITS MANUFACTURE

BACKGROUND AND SUMMARY OF THE INVENTION

The present invention relates to a flame-resistant plaster board, which is markedly inhibited in generation of smoke on heating or fire without reduction of the mechanical strength.

A large amount of plaster board is now in use as a flame-resistant building material due to the excellent flame-resistant performance and low-price of plaster. The flame-resistant and mechanical performances of a plaster board depend largely upon the property of the board paper constituting the outside of the plaster board. When a plaster board has a thin plaster layer, such tendency is more increased.

The board paper will burn on heating or fire, but the firing of the board paper is inhibited by the dehydration of plastic dihydrate, thus causing a phenomenon called "smolder". Accordingly, in the smolder, the generation of smoke tends to become large because of the controlling of temperature rise of the board material. The weight of the board paper constituting the outside of the plaster board is limited, for instance, to about 300 g/m² in the case of a plaster board of about 9 mm in thickness, for practical use. Even with such limitation, the plaster board shows a smoking coefficient (C.A.) of only around 60, which is the second class of fire-resistance ("semi-non-inflammable") as specified by JIS (Japanese Industrial Standard) A-1321, or sometimes more. The term "smoking coefficient" herein used is intended to express an amount of smoke in the surface-heating test of a plaster board which is specified in JIS A-1321.

In order to maintain the excellent flame-resistant performance of a plaster board, non-inflammable mineral fibers such as glass wool and asbestos fibers may be used as a material for the board paper. However, these mineral fibers are relatively expensive and insufficient in adhesion to plaster. While it has been proposed to coat the surface of a plaster board prepared by a conventional method with a swellable fire-proof paint or to over the said surface with an aluminum foil, the plaster board thus obtained is not economical. Impregnation of the board paper as a material for a plaster board with an aqueous solution of a flame retardant such as ammonium sulfamate guanidinocarbonic acid, ammonium phosphate or ammonium polyphosphate can not produce a satisfactory smoke-inhibiting effect.

As an result of the extensive study on the economical treatment of a plaster board for enhancement of its flame-resistant performance, particularly of its performance in inhibiting the generation of smoke on heating or fire without reduction of the mechanical strength, it has been found that a remarkable smoke-inhibiting effect can be obtained by allowing a board paper to contain at least one alkali compound which easily decomposes or melts on heating. A plaster board with such board paper having, for example, a thickness of about 9 mm passes the grade "non-inflammable" when tested according to the method as specified in JIS A-1321.

According to the present invention, there is provided a flame-resistant plaster board characterized in that the board paper constituting the outside of the plaster board contains at least one alkali compound selected from the group consisting of hydroxides and salts of alkali metals and alkaline earth metals, which easily decompose or melt on heating.

As the hydroxides and salts of alkali metals, there may be exemplified $MOH$, $MHCO_3$, $M_2CO_3$, $MAlO_2$, $M_2O(SiO_2)_{1-3}$, $M_2SnO_3$, $M_2MoO_4$, $M_2WO_4$, $RM$, $R'M_2$ and $R'HM$ (wherein M is sodium or potassium, R is a $C_1$–$C_3$ monobasic fatty acid residue and R' is a $C_2$–$C_4$ dibasic fatty acid residue). As the hydroxides and salts of alkaline earth metals, there may be exemplified $M'(OH)_2$, $M'CO_3$, $R_2M'$ and $R'M'$ (wherein M' is calcium, magnesium or strontium and R and R' are each as defined above). Specific examples include sodium hydroxide, sodium carbonate, sodium hydrogencarbonate, sodium formate, sodium acetate, sodium oxalate, sodium succinate, sodium aluminate, water glass, potassium hydroxide, potassium carbonate, potassium hydrogencarbonate, potassium formate, potassium acetate, potassium oxalate, potassium succinate, calcium formate, calcium oxalate, etc. Economically preferred are salts of sodium and calcium. These compounds will be hereinafter referred to as "alkali compounds". The alkali compounds as mentioned above may be used alone or in combination.

The effective amount of the alkali compound for inhibiting the generation of smoke is about 1 to 30 % by weight, preferably about 3 to 15 % by weight, based on the weight of the board paper. When the amount of the alkali compound is less than the said lower limit, the smoke-inhibiting effect of the plaster board is much lowered. While the use of the alkali compound is an amount more than the said upper limit does not result in the elevation of the effect, it rather produces disadvantages such as exudation of the alkali compound to the surface of the board paper due to the hydroscopic property. The alkali compound is usually employed in the form of aqueous solution or slurry at a concentration of about 10 to 30 % by weight.

The flame-resistant plaster board of the invention may be prepared by treating a plaster board molded in advance with an aqeuous solution or slurry of the alkali compound to impregnate such solution or slurry into the board paper constituting the outside of the plaster board, or by molding a plaster board using a constituent of the outside a board paper previously treated with an aqueous solution or slurry of the alkali compound to impregnate such solution or slurry therein.

For instance, an aqueous solution or slurry of the alkali compound is applied to a plaster board so as to penetrate the solution into the board paper constituting its outside, optionally followed by treatment with a water-repellent, and the resulting plaster board is dried. This process is applicable irrespective of the kind of the alkali compound, and low-price alkali compounds such as water glass, sodium hydroxide and sodium carbonate may be employed.

Further, for instance, the alkali compound sparingly soluble in water (e.g. oxalates) in the form of aqueous slurry is applied to papers which are used to constitute the surface and inner layers of a board paper, and the resulting papers are laminated with a paper which is used to constitute the back side layer and is not applied the alkali compound to make a broad paper. Using such board paper, a plaster board which is flame-resistant may be molded.

Furthermore, for instance, an aqueous solution of the alkali compound showing nearly neutral such as formates or acetates is applied to a board paper, for instance, by dipping or coating; if necessary, the resulting board paper may be treated with a water-repellent, followed by drying. The thus prepared board paper is molded to make a plaster board. The use of such salt which hinders the adhesion between the plaster and the board paper as alkali metal salts other than formates and acetates is to be avoided.

In general, the board paper constituting or to constitute the outside of a plaster board is treated with a water-repellent, and therefore its treatment with the alkali compound does not sometimes assure the sufficient penetration unless a strongly basic alkali compound such as sodium hydroxide, water glass, sodium aluminate or sodium metasilicate is used. When the alkali compound does not sufficiently penetrate into the board paper, it may be crystallized out on the surface of the board paper on drying so that a satisfactory smoke-inhibiting effect is not exerted. Because of this reason, the pre-treatment of the board paper with a penetrating agent is recommended. As the penetrating agent, there may be used an aqueous solution of a surfactant, a water-soluble lower aliphatic alcohol, aqueous ammonia or the like. Among them, the use of a surfactant is particularly preferred. In case of using a surfactant as the penetrating agent, an aqueous solution containing about 0.5% by weight of the surfactant may be impregnated into the board paper in an amount of about 50 to 100 g/m$^2$.

As the result of the treatment with the alkali compound, the board paper may tend to lose the sizability resulting in deterioration of water-resistance. Therefore, the plater board after the treatment with the alkali compound is desired to be treated with a water-repellent. As the water-repellent, there may be used, for instance, paraffin waxes, petroleum resins, polyfatty acids, silicon resins and other synthetic resins, preferably in the form of aqueous emulsion. For instance, their aqueous emulsion having an available solid content of about 5% by weight may be applied to the board paper treated with an aqueous solution or slurry of the alkali compound in an amount of about 30 to 50 g of the aqueous solution or slurry per m$^2$, followed by drying. The resulting board paper will have a satisfactory water-repellency. In this case, however, care should be taken to avoid the attachment of the water-repellent to the board paper in a too large amount, since otherwise the generation of smoke will tend to increase on heating.

As mentioned above, the penetrating agent, the alkali compound as a smoke-inhibiting agent and the water-repellent may be applied to a plaster board or the board paper constituting its outside in separate operations. It is, however, more convenient to formulate these three agents in a single (i.e. one liquid type) composition and apply such composition to the plaster board or the board paper by a single operation.

The said one liquid type composition may be composed of the penetrating agent (e.g. aqueous ethanol), the alkali compound (e.g. sodium formate) and the water-repellent (e.g. petroleum resin, polyfatty acid) dispersed in an aqueous medium. For this purpose, a surfactant of the formula:

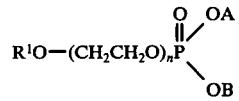

wherein $R^1$ is alkyl, aralkyl, A and B are each hydrogen or $R^1O-(CH_2CH_2O)_n-$ and $n$ is a number of about 1 to 30 in the form of, for example, about 0.5 % by weight of aqueous solution is advantageously used as the penetrating agent.

The one liquid type composition may be prepared, for example, by firstly dissolving sodium formate in about 20 to 30% by weight aqueous ethanol so as to make a concentration of about 15 to 30% by weight of the sodium formate and mixing the resultant solution (about 90 to 85 parts by weight) with a petroleum resin emulsion having an available solid content of about 5 to 10% by weight (about 10 to 15 parts by weight).

The thus obtained one liquid type composition is stable and exhibits a remarkable smoke-inhibiting effect when applied to a molded plaster board, for instance, in a proportion of about 20 to 300 g/m$^2$.

As for the smoke-inhibiting effect on a plaster board, the alkali metal salts are generally superior to that of the alkaline earth metal salts. On the other hand, the alkaline earth metal salts are usually superior to the alkali metal salts in the adhesion between the plaster and the board paper. It is favorable to treat a board paper with mixed salts (i.e. alkali metal salts and alkaline earth metal salts) which have the combined characteristics of the both metals and to mold a plaster board using the thus treated board paper. For example, a board paper may be dipped in or coated with an aqueous solution containing sodium formate and calcium formate in a weight ratio of 1:0.0 1-2, preferably 1 : 0.1-1. The penetration of the solution is promoted by previously applying the said penetrating agent to the board paper or by incorporating such penetrating agent into the solution. The resulting board paper may be, if necessary, treated with a water-repellent.

A plaster board can be molded by charging a plaster slurry, which is prepared by kneading water and plaster halfhydrate, between the two pieces of board paper and hardening the plaster slurry, followed by drying. The plaster halfhydrate may be in either of α-form or β-form. Further, in order to improve the adhesion between the plaster layer and the board paper, organic adhesives such as polyvinyl alcohol, methyl cellulose, dextrin and synthetic resin emulsion may be incorporated into the plaster slurry.

The smoke-inhibiting treatment of this invention may be applied to a lightweight plaster board which contains air bubbles or lightweight aggregates in the plaster layer.

The present invention will be illustrated in greater details with reference to the following examples, but the present invention is not limited to those examples and can be applied in various ways within the scope of the invention. Unless otherwise stated, all percentages and parts in the examples are by weight.

EXAMPLE 1

An aqueous solution containing 0.5 % of "Neocol SW-C" (surfactant made by Daiichi Kogyo Seiyaku Co.) as a penetrating agent was applied to a commercial plaster board (9 mm in thickness) by spraying in an amount of 60 g/m$^2$ or 100 g/m$^2$. Then, without drying, an aqueous solution containing 30 % of the alkali compound was applied thereto by spraying in a predetermined amount, and the resulting plaster board was dried at 60° C for 8 to 12 hours. After cooling, the plaster board was measured for the smoking coefficient according to the surface-heating test as specified in JIS A-1321. The results are shown in Table 1.

In Test No. 1, the commercial plaster board was used, as it is, as control. In Test Nos. 17 to 20, the commercial plaster board was treated with an aqueous solution containing a known flame-retardant.

As shown in Table 1, the plaster board treated with the known flame-retardant (Test Nos. 17 to 20) exhibits no improved smoke-inhibiting effect as compared with the untreated commercial plaster board used as control (Test No. 1). On the other hand, the plaster board treated according to the present invention (Test Nos. 2 to 16 and 32 to 34) exhibits an excellent smoke-inhibiting effect.

Table 1

| Test No. | Alkali Compound Aqueous solution | Amount (g/m²)*3 | Penetrating agent (g/m²)*3 | Surface-heating test TΔΘ | C.A. |
|---|---|---|---|---|---|
| 1 | — | — | — | 0 | 54 |
| 2 | 30 % Water glass | 210 | — | 0 | 8 |
| 3 | 30 % Water glass | 105 | — | 0 | 22 |
| 4 | 30 % Water glass | 87 | — | 0 | 35 |
| 5 | 30 % Sodium carbonate | 210 | 60 | 0 | 5 |
| 6 | 30 % Sodium carbonate | 105 | 60 | 0 | 7 |
| 7 | 30 % Sodium carbonate | 60 | 60 | 0 | 9 |
| 8 | 30 % Sodium aluminate | 210 | 100 | 0 | 3 |
| 9 | 30 % Sodium aluminate | 105 | 100 | 0 | 8 |
| 10 | 30 % Sodium aluminate | 60 | 100 | 0 | 14 |
| 11*1 | 30 % Sodium acetate | 210 | 100 | 0 | 14 |
| 12*1 | 30 % Sodium acetate | 105 | 100 | 0 | 18 |
| 13*1 | 30 % Sodium acetate | 60 | 100 | 0 | 24 |
| 14 | 30 % Sodium formate | 210 | 100 | 0 | 6 |
| 15 | 30 % Sodium formate | 105 | 100 | 0 | 8 |
| 16 | 30 % Sodium formate | 60 | 100 | 0 | 9 |
| 32 | Saturated (ca. 15 %) calcium formate | 210 | 100 | 0 | 21 |
| 33 | Saturated (ca. 15 %) calcium formate | 105 | 100 | 0 | 22 |
| 34 | Saturated (ca. 15 %) calcium formate | 60 | 100 | 0 | 24 |
| 17*2 | 20 % Ammonium polyphosphate | 210 | 100 | 0 | 41 |
| 18 | 40 % Ammonium phosphate | 155 | 100 | 0 | 40 |
| 19 | 30 % Guanidinocarbonic acid | 210 | 100 | 0 | 48 |
| 20 | 50 % Ammonium sulfamate | 155 | — | 0 | 51 |

Note:
*1Sodium acetate used in Test Nos. 11 to 13 is a trihydrate.
*2In Test No. 17, ammonium polyphosphate was used as a hot aqueous solution of 80° C.
*3The amount indicates the one not of the agent itself but of its aqueous solution.

EXAMPLE 2

A commercial plaster board (9 mm in thickness) was treated with a 0.5% aqueous solution of "Neocol SW-C" as a penetrating agent in an amount of 105 g/m², and then an aqueous solution containing 30% of sodium carbonate (anhydrous) was applied thereto in an amount of 105 g/m² by spraying. Thereafter, a water-repellent was applied to the plaster board by spraying, and the plaster board was dried at 60° C for 8 to 12 hours and allowed to cool. The plaster board was measured for the smoking coefficient in the same manner as in Example 1. The water-repellency was judged by dropping waterdrops onto the surface of the plaster board. The results are shown in Table 2.

In Test No. 21, the plaster board was treated with an aqueous sodium carbonate solution alone. In Test Nos. 22 to 24, the plaster board was treated with an aqueous paraffin was emulsion of 2.5 % available solid content. In Test Nos. 25 and 26, the plaster board was treated with an aqueous petroleum resin emulsion of 3% available solid content. In Test No. 27, the plaster board was treated with an aqueous silicon resin emulsion of 20% resin content.

Table 2

| Test No. | Water-repellent Agent | Amount (g/m²)*1 | Surface-heating test TΔΘ | C.A. | Water-Repellency |
|---|---|---|---|---|---|
| 21 | — | — | 0 | 6 | No |
| 22 | Paraffin wax | 61 | 0 | 9 | Slightly poor |
| 23 | Paraffin wax | 105 | 0 | 11 | Slightly good |
| 24 | Paraffin wax | 145 | 0 | 13 | Good |
| 25 | Petroleum resin | 61 | 0 | 8 | Good |
| 26 | Petroleum resin | 105 | 0 | 9 | Good |
| 27 | Silicon resin | 61 | 0 | 9 | Good |

Note:
*1The amount indicates the one not of the agent itself but of its aqueous emulsion.

EXAMPLE 3

Into a mixture of 0.75 kg of ethanol and 2.05 kg of water, 1.5 kg of sodium formate were dissolved, and 0.7 kg of an aqueous petroleum resin emulsion of 6 % available solid content was uniformly dispersed therein. The resulting liquor was sprayed onto the both sides of a commercial plaster board of "semi-non-inflammable" grade (9 mm in thickness). After the liquor penetrated into the board paper, the plaster board was dried at 60° C for 4 hours and then allowed to cool. Various properties of the resultant plaster board were measured, and the results are shown in Table 3. The plaster board passed the grade "non-inflammable" according to the fire-proof test.

Table 3

| Test No. | Sodium formate (g/m²)*1 | Surface-heting test*2 TΔΘ | C.A. | Combustibility test*2 | Peeling test*3 | Bending strength*4 (kg) | Water repellency*5 |
|---|---|---|---|---|---|---|---|
| 28 | — | 0 | 54 | — | Pass | 27.2 | Good |
| 29 | 61 | 0 | 21 | Pass | Pass | 27.5 | Good |
| 30 | 105 | 0 | 15 | Pass | Pass | 27.4 | Good |
| 31 | 145 | 0 | 11 | Pass | Pass | 28.0 | Good |

Note:
*1The amount of sodium formate indicates the one of its mixed solution used for one side of the plaster board.
*2The surface-heating test and the combustibility test were effected according to JIS A-1321.
*3The peeling test was carried out according to JIS A-6901.
*4The test condition of bending strength: test piece, 9 × 70 × 200 mm; spun (lengthwise), 150 mm.
*5The water-repellency was judged visually by dropping waterdrops onto the treated surface.

EXAMPLE 4

A commercial board paper for plaster board (thickness, 0.45 mm; basis weight, 280 g/m²) was impregnated at room temperature with an aqueous solution containing calcium formate together with or without sodium formate, dried at 80° C for 40 minutes and allowed to stand overnight. Two pieces of the board paper were fixed to a mold frame and then a plaster slurry, prepared by mixing for 1 minute 500 parts of β-form plaster halfhydrate, 10 parts of calcium sulfate dihydrate (reagent grade) and 350 parts of water, was charged between them. After the plaster slurry was hardened, the molded plaster board was taken out, dried at 60° C for a whole day and night and formed into a plaster board having a dimension of 250 × 250 × 9 mm. The plaster board thus obtained was tested for the fire-proof performance and the peeling strength according to JIS A-6901. The test results are as shown in Table 4.

In Test No. 35, non-treated board paper was used for molding the plaster board. The plaster board (Test No. 35) emitted a large amount of smoke and therefore did not pass the grade "non-inflammable", while all the plaster boards according to the present invention (Test Nos. 36 to 38) passed the grade "non-inflammable".

Table 4

| Test No. | Formate Aqueous solution | Amount (%)[*1] | Peeling strength (kg) | Surface-heating test TAΘ | C.A. | Combustibility |
|---|---|---|---|---|---|---|
| 35 | — | — | 2.6 | 0 | 59 | — |
| 36 | Saturated with Ca formate | 13.2 | 3.2 | 0 | 27 | Pass |
| 37 | Na formate and Ca formate (1:1 by weight) | 10.0 | 2.9 | 0 | 15 | Pass |
| 38 | Na formate and Ca formate (1:0.5 by weight) | 10.1 | 2.6 | 0 | 7 | Pass |

Note:
[*1]The amount indicates the weight percentage of the formate itself based on the board paper.

EXAMPLE 5

A commercial top board paper prepared by a conventional method (thickness, 0.5 mm; basis weight, 310 g/m$^2$) and a commercial back side board paper prepared by a conventional method (thickness, 0.45 mm; basis weight, 280 g/m$^2$) were impregnated at room temperature with an aqueous formate : calcium formate = 1 : 0.5 by weight). The impregnated board papers were then dried at 80° C for 40 minutes and allowed to stand overnight. The board papers were fixed to a vertical mold frame, and a foaming plaster slurry separately prepared was charged between them. The foaming plaster slurry was prepared by stirring a mixture of 50 parts of an aqueous solution containing 0.75% of polyoxyethylene dodecyclphenyl ether (foaming agent) and 200 parts of an aqueous solution containing 0.3% of methyl cellulose (thickening agent) for 30 seconds by means of a commercial mixer, adding 500 parts of α-form plaster half-hydrate (water for normal consistency, 37%) to the resultant foaming liquor and kneading the resulting mixture for 1 minute by means of a screw type stirrer. After the plaster slurry was hardened, the plaster board was dried at 60° C for a whole day and night and then formed into a plaster board having a dimension of 250 × 250 × 9 mm. The plaster board thus obtained was tested in the same manner as described in Example 4. The results are as shown in Table 5. All the plaster boards according to the present invention passed the grade "non-inflammable".

Table 5

| Test No. | Formate Aqueous solution | Amount (%)[*1] | Bulk density (g/cm$^3$) | Peeling strength (kg) Top | Back Side | Bending strength (kg) | surface heating test TAΘ | C.A. | Combustibility test |
|---|---|---|---|---|---|---|---|---|---|
| 39 | Na salt/Ca salt = 1:0.5 15 % aqueous solution | — | 0.78 | 3.7 | 3.0 | 19.2 | 0 | 58 | — |
| 40 | Na salt/Ca salt = 1:0.5 15 % aqueous solution | 2.90 | 0.79 | 3.2 | 2.6 | 19.4 | 0 | 18 | Pass |
| 41 | Na salt/Ca salt = 1:0.5 15 % aqueous solution | 7.02 | 0.75 | 3.2 | 2.7 | 19.0 | 0 | 8 | Pass |
| 42 | Na salt/Ca salt = 1:0.5 15 % aqueous solution | 11.55 | 0.81 | 3.1 | 2.5 | 20.0 | 0 | 7 | Pass |

Note:
[*1]The amount indicates the weight percentage of the formate itself based on the board paper.

EXAMPLE 6

Alkali formates (i.e. Na formate : Ca formate = 1 : 0.5 by weight) were dissolved in an aqueous solution containing 0.5% of polyoxyethylene alkyl(aryl) ether phospate (surfactant) to make a concentration of 15%, and the supernatant was applied to the back surface of a commercial board paper (top, back side) as in Example 5 by brushing. After drying at 80° C for 40 minutes and allowing to stand overnight, the resulting top board paper was placed at the lower part of the horizontal mold frame, and the foaming plaster slurry separately prepared was charged thereon. Thereafter, the back side board paper treated as above was placed on the plaster slurry. The whole was pressed by a roller, hardened and dried at 60° C for a whole day and night, and the molded plaster board was formed into a plaster board having a dimension of 250 × 250 × 9 mm. The foaming plaster slurry was prepared by stirring a mixture of 50 parts of an aqueous solution containing 0.75% of polyoxyethylene dodecylphenyl ether (foaming agent), 100 parts of an aqueous solution containing 0.5 % of dextrin (adhesion agent) and 100 parts of aqueous solution containing 0.3% of methyl cellulose (thickening agent) for 30 seconds by means of a commercial mixer and then treating the resultant foaming plaster slurry as in Example 5. The performances of the plaster board thus obtained are as shown in Table 6. All the plaster boards passed the grade "non-inflammable".

Table 6

| Test No. | formate (%)[*1] Top | formate (%)[*1] Back side | Bulk density (g/cm³) | Peeling strength (kg) Top | Peeling strength (kg) Back side | bending strength (kg) | surface heating test TΔΘ | surface heating test C.A. | combustibility test |
|---|---|---|---|---|---|---|---|---|---|
| 43 | 4.20 | 4.46 | 0.87 | 3.1 | 2.7 | 21.2 | 0 | 6 | Pass |
| 44 | 4.15 | 4.29 | 0.88 | 3.4 | 3.0 | 20.8 | 0 | 4 | Pass |
| 45 | 4.11 | 4.08 | 0.85 | 3.3 | 3.0 | 21.7 | 0 | 6 | Pass |

Note:
[*1]The amount indicates the weight percentage of the formate itself base on the board paper.

The invention being thus described, it will be obvious that the same may be varied in many ways. Such variations are not to be regarded as a departure fromm the spirit and scope of the invention, and all such modifications as would be obvious to one skilled in the art are intended to be included within the scope of the following claims.

What is claimed is:

1. A flame-resistant plaster board, characterized in that the board paper constituting the outside of said plaster board contains a mixture of sodium formate and calcium formate, and a penetrating agent.

2. The board according to claim 1, wherein the board paper further contains a water repellant.

3. The board according to claim 1, wherein the board paper contains 1 to 30% by weight of the mixture based on the weight of the board paper.

4. The board according to claim 1, wherein the weight ratio of sodium formate and calcium formate is 1:0.01–2.

5. The board according to claim 1, wherein the pentrating agent is selected from the group consisting of surfactants, water-soluble lower aliphatic alcohols and ammonia.

6. The board according to claim 1, wherein the penetrating agent is a surfactant of the formula:

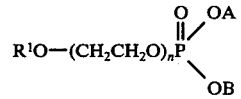

wherein R[1] is alkyl or aralkyl, A and B are each hydrogen or R[1]O—(CH₂CH₂O)$_n$— and $n$ is a number of about 1 to 30.

7. The board according to claim 1, wherein the board paper contains a surfactant as the penetrating agent in an amount of about 50 to 100 g/m².

8. A method for making a plaster board smoke-inhibited on heating, which comprises treating the plaster board molded with an aqueous solution or slurry of a mixture of sodium formate and calcium formate to impregnate the solution or slurry into the board paper constituting the outside of the plaster board, or by molding a plaster board usig as a constituent of the outside a board paper previously treated with an aqueous solution or slurry of the said mixture.

* * * * *